United States Patent Office 3,532,523
Patented Oct. 6, 1970

3,532,523
ALKALI-METAL VAPOR RESISTANT GLASS
Hendrik Jacobus Maria Joormann and Gustaaf Adolf Wesselink, Emmasingel, Eindhoven, Netherlands, assignors, by mesne assignments, to U.S. Philips Corporation, New York, N.Y., a corporation of Delaware
No Drawing. Filed Apr. 26, 1967, Ser. No. 633,698
Claims priority, application Netherlands, May 26, 1966, 6607263
Int. Cl. C03c 3/14, 3/30; H01i 61/74
U.S. Cl. 106—47                2 Claims

ABSTRACT OF THE DISCLOSURE

A borate glass containing alumina, alkaline earth oxides and lithium oxide resistant to attack by hot alkali-metal vapors.

---

This invention relates to a glass which is resistant to alkali-metal vapors, particularly sodium vapor.

Such glasses, several of which are known, are used especially for the envelope of a sodium-vapor discharge lamp.

Such glasses contain boron oxide, aluminum oxide, alkaline-earth metal oxides and an alkali-metal oxide and notably must satisfy the conditions that they contain no more than 45% by weight of $Al_2O_3$. They also must contain not more than 5% of quadrivalent oxides, antimony oxide, arsenic oxide, lead oxide and alkali metal oxides together, at least 6% and no more than 80% of bivalent oxides. Lastly the sum of 1.5 times the content of bivalent oxides, except lead oxide and aluminum oxide, must be at least 45%.

In general, such glasses are technologically unsuitable. Several of them are, in practice, what is called "too short" in glass technology, which means that the curve illustrating the viscosity as a function of temperature has an excessive slope. The majority of these glasses also crystallize to an extent which varies from spontaneous to fairly easy, which is another reason for their unsuitability.

Upon investigation it has been found that glasses which did not crystallize when melted in the coal-flame, did crystallize when melted in the natural gas flame, and in certain cases even to a considerable extent. What cause is responsible for this could not be explained hitherto.

In accordance with the invention a glass is provided which can be worked in a natural gas flame without any trace of crystallization. This glass shows an interesting viscous behavior and need not be refined. The temperature range in which the viscosity varies between $10^{7.6}$ poises and $10^{12.4}$ poises extends from approximately 100° C. to 120° C.

The composition of the glass lies within a very narrow limit. Furthermore, the presence of $Li_2O$ between very narrow limits is also novel. The latter has, in comparison with corresponding $Li_2O$—free glass, a very favorable influence on the glass in the sense that the tendency of crystallization is suppressed. This is a surprising fact since in general a glass has on the contrary a greater tendency toward crystallization by the addition of $Li_2O$.

The glass according to the invention has a composition in mol percent between the following limits.

$B_2O_3$ ---------------------------------------------------- 28–31
$Al_2O_3$ --------------------------------------------------- 23–29
CaO ----------------------------------------------------- 11–28
BaO ----------------------------------------------------- 11–28
$Li_2O$ ----------------------------------------------------- 5–8

Preferably, the composition lies between the following limits:

$B_2O_3$ ---------------------------------------------------- 29–31
$Al_2O_3$ --------------------------------------------------- 24–28
CaO ----------------------------------------------------- 12–26
BaO ----------------------------------------------------- 12–26
$Li_2O$ ----------------------------------------------------- 6–8

When expressed in percent by weight, the last mentioned composition is approximately:

$B_2O_3$ ---------------------------------------------------- 23–26
$Al_2O_3$ --------------------------------------------------- 29–34
CaO ----------------------------------------------------- 12–18
BaO ----------------------------------------------------- 25–30
$Li_2O$ ----------------------------------------------------- 2–3 wherein the total amount of CaO+BaO+$Li_2O$ is from 41 to 46% by weight.

The following three glasses are exemplary and when starting in the usual manner from boric acid, aluminum oxide, calcium carbonate, barium carbonate, and lithium carbonate, were obtained by melting without any refining agent being required. These examples are not limitative of the invention, however, which is defined in the appended claims.

TABLE

| | 1 | | 2 | | 3 | |
|---|---|---|---|---|---|---|
| | Percent by weight | Mol percent | Percent by weight | Mol percent | Percent by weight | Mol percent |
| $B_2O_3$ | 24.8 | 30 | 25 | 30 | 27.7 | 32 |
| $Al_2O_3$ | 30.2 | 25 | 33 | 27.5 | 29 | 23 |
| CaO | 15.0 | 22.5 | 14.5 | 21.3 | 19.5 | 28 |
| BaO | 27.3 | 15 | 25 | 14.1 | 21.8 | 11.5 |
| $Li_2O$ | 2.7 | 7.5 | 2.5 | 7.1 | 2.0 | 5.5 |

The first mentioned glass has a viscosity of $10^{12.4}$ poises at 517° C. and its softening point, which is the temperature at which the viscosity is $10^{7.6}$ poises, lies at 620° C. For the second glass these temperatures are 518° C. and 638° C. respectively and for the third glass 492° C. and 623° C., respectively.

From these glasses tubes were drawn and subsequently worked up into low-pressure sodium vapor lamps filled with neon gas of 6 mm. Hg. These tubes did not exhibit any discoloration, after 1000 hours of continuous operation at 360° C., that is to say 100° C. above the rated temperature.

What is claimed is:

1. A glass resistant to attack by alkali-metal vapor and non-crystallizing in a natural gas flame consisting essentially of boron oxide, aluminum oxide, an alkaline-earth metal oxide, and an alkali-metal oxide, said glass having composition in mol percent between the following limits:

$B_2O_3$ ---------------------------------------------------- 28–32
$Al_2O_3$ --------------------------------------------------- 23–29
CaO ----------------------------------------------------- 11–28
BaO ----------------------------------------------------- 11–28
$Li_2O$ ----------------------------------------------------- 5–8

2. A glass as claimed in claim 1, in which the glass has a composition in mol percent between the following limits:

$B_2O_3$ ---------------------------------------------------- 29–31
$Al_2O_3$ --------------------------------------------------- 24–28
CaO ----------------------------------------------------- 12–26
BaO ----------------------------------------------------- 12–26
$Li_2O$ ----------------------------------------------------- 6–8

(References on following page)

References Cited

UNITED STATES PATENTS 1,570,876   1/1926   Compton _____ 106—47

OTHER REFERENCES

Elyard, C. A., et al., The Resistance of Glasses of Simple Composition to Attack by Sodium Vapor at Elevated Temperatures.

In Advances in Glass Technology. N.Y., Plenum Press, 1962, p. 280.

TOBIAS E. LEVOW, Primary Examiner

M. L BELL, Assistant Examiner

U.S. Cl. X.R.

313—182